United States Patent [19]

Pai et al.

[11] Patent Number: 4,773,717
[45] Date of Patent: Sep. 27, 1988

[54] TRANSPARENCY HAVING A SECOND SURFACE MULTILAYER DECORATIVE COATING

[75] Inventors: Purnachandra Pai, Birmingham; Jun S. Im, Detroit; John Piner, Lincoln Park, all of Mich.

[73] Assignee: Ovonic Synthetic Materials Co., Troy, Mich.

[21] Appl. No.: 926,307

[22] Filed: Nov. 3, 1986

[51] Int. Cl.$^4$ ................................................ G02B 5/28
[52] U.S. Cl. ..................................... 350/3.7; 350/164; 350/166; 350/262
[58] Field of Search ................. 350/164, 1.7, 262, 166

[56] References Cited

U.S. PATENT DOCUMENTS 3,846,152 11/1974 Franz .................................... 350/166
3,935,351 1/1976 Franz ................................. 350/1.7 X Primary Examiner—Bruce Y. Arnold
Attorney, Agent, or Firm—Richard M. Goldman; Marvin S. Siskind

[57] ABSTRACT

Disclosed is a coated article, for example an architectural transparency, or a vehicular transparency, or a reflecting article, as a decorative article. The article has a substrate, e.g., a substantially transparent substrate. The substrate has an optical coating on a surface thereof. The coating is a bilayer dielectric thin film having a thickness corresponding to a constructively interfering function of a wavelength of interest. The bilayer thin film is a metallic layer, which serves as an adhesion layer, with a dielectric atop the metallic layer which is a compound of the metal forming the metallic layer.

5 Claims, 3 Drawing Sheets

TRANSPARENCY HAVING A SECOND SURFACE MULTILAYER DECORATIVE COATING

FIELD OF THE INVENTION

The invention disclosed herein relates to transparencies, e.g., glass and plastic transparencies having decorative color coatings that utilize optical interference phenomena for their color and decorative effect.

BACKGROUND OF THE INVENTION

Flat glass is utilized as windows for buildings and vehicles. The glasses so utilized have a relatively flat transmission curve across the near infra-red, visible, and ultra-violet portions of the electro-magnetic spectrum. For many applications, it would be desirable to reflect some portions of the spectrum, and transmit other portions, either with or without attenuation. Various pigments, dyes, and metallic color coatings have been used to these ends. For example, high and low refractive index coatings have been used as anti-reflection coatings, i.e., to increase transmission, while multi-layer coatings, dyes, and chemical modification of the subjacent glass have been used to impart color.

High and low refractive index materials have heretofore been used as neutral color anti-reflective coatings on transparent substrates. First surface, multi-layer anti-reflective coatings are described, for example, in U.S. Pat. Nos. 3,410,625 to Edwards, 3,781,089 to Cicotta, 3,958,042 to Katsube and 3,176,575 to Socha. Edwards describes a repeating structure of dielectric layer pairs, one member of the layer pair being a high refractive index material, and the other member of the layer pair being a low refractive index material. The layer thickness is L/4n where L is the wavelength sought to be reflected, and n is the refractive index of the light of wavelength L in the medium.

Cricotta, et al describe an anti-reflecting neutral density filter made up of a repeating structure of layer pairs on the first surface of a glass body. One member of the layer pair is a high refractive index metal, and the other member is a low refractive index dielectric. The alternating layer pair structure provides a non-colored, neutral density filter of desired optical density and reflectivity.

Katsube, et al describe an anti-reflecting coating on the first surface of a glass body. The coating has alternating high and low refractive index layers. Each layer has a thickness on the order of 0.0125 to 0.050 wavelengths. The anti-reflective coating is color free.

Socha describes a low reflectance multilayer for the first surface of glass. The multilayer includes a $SiO_2$ layer approximately 1/32 to 1/16 wavelength thick on the glass, and high refractive index layer approximately ½ wavelength thick on the $SiO_2$, and an intermediate refractive index coating approximately ½ wavelength thick atop the high refractive index layer. The resulting colorless coating is an anti-reflective coating.

U.S. Pat. Nos. 4,188,452 to Groth and 3,411,934 to Englehart utilize first surface multiple oxide coatings for architectural effect. Groth uses layers of $SiO_2$ and $TiO_2$ to reflect ultraviolet light. Englehart uses multiple layers of cobalt oxide and tin oxide on the first surface of glass to provide a color reflecting coating.

U.S. Pat. No. 4,170,460 to Donley describes a method of making colored glass articles by the migration of optically active metal ions into the first surface of a chemically tempered glass substrate, thereby forming a colored, high refractive index zone within the glass. This metallized zone has a higher refractive index then the subjacent glass. A metal layer is then deposited above the treated glass and completely oxidized to form a coating of higher refractive index. The resulting oxide coating interacts with the chemically tempered, metal-ion containing glass to form an interference film.

The use of first surface reflective coatings of high refractive index oxides is disclosed in published British patent application No. 2,063,920 of J. P. Coad, et al. Coad, et al describes production of reflective surfaces by ion beam sputtering of enumerated transition metals onto a substrate and subsequent anodizing of the sputtered metal to form a high refractive index oxide thin film, capable of interference. However, Coad, et al do not disclose partially transparent coatings. Their coatings are opaque. Nor does the Coad patent disclose thermal oxidation or plasma oxidation of the sputtered metal film.

SUMMARY OF THE INVENTION

The present invention provides transparencies having a semi-transparent thin film, dielectric coatings of brilliant, saturated colors on a surface of a glass substrate. This is done by balancing the reflections from top and bottom interfaces of the semitransparent dielectric thin film. That is, this is done by balancing the reflectances at (1) the dielectric-substrate or dielectric-adhesion layer interface, $r_1$, and (2) the dielectric-superjacent material interface or the dielectric free surface, $r_2$. When these reflectances are imbalanced the colors are dull and lack finesse. However, when these two reflectances are substantially equal and large, the reflected colors are brilliant saturated colors, of high finesse. When the reflectances $r_1$ and $r_2$ are substantially equal, the reflectivities as a function of wavelength are given by:

$$R_{max}(\text{wavelength}) = [(r_1 + r_2)/(1 + r_1 r_2)]^2, \quad (1)$$

and $$R_{min}(\text{wavelength}) = [(r_1 - r_2)/(1 - r_1 r_2)]^2. \quad (2)$$

The purity of color is given by $$(R_{max} - R_{min})/R_{min}, \quad (3)$$

where $R_{max}$ is given by equation (1), and $R_{min}$ is given by equation (2).

When $r_2$ is not equal to $r_1$, the reflectances are imbalanced, and the resulting colors lack finesse. According to the invention herein contemplated a semitransparent coating is provided on a surface of a transparency, the coating having relatively balanced reflectances, i.e., the first surface reflection, $r_1$, as shown in FIG. 1 is 25 to 35 percent, and the second surface reflectance, $r_2$, is 10 to 15 percent.

According to the invention contemplated herein, there is provided a semi-transparent reflecting article. The article, for example, an architectural transparency, a glass substrate vehicle window, or a polymeric substrate vehicle window, has a substantially transparent substrate with a partially reflective, partially light transmitting thin film dielectric surface deposited thereon. The partially reflecting, partially transmitting thin film is a transparent dielectric, e.g., a transparent oxide of a transition metal, extending outward from the substrate to a thickness that is sufficient to provide substantially constructive interference of a desired band of optical wavelengths and substantially destructive interference of other bands of optical wavelengths. There is provided a thin coating, e.g., less than one quarter wavelength, between the dielectric and the substrate. This layer is a metal layer, which serves as an adhesion layer and as an interfacial layer, has a thickness less than one quarter wavelength, and preferably from 100 to 200 Angstroms. The oxide is an odd quarter ($\frac{1}{4}$, $\frac{3}{4}$, 5/4, ...) of a wavelength thick, and generally above about 420 angstroms thick, but not so thick as to result in a colorless coating, i.e., it is less than about 3200 angstroms thick.

An unoxidized remainder of the dielectric thin film, that is, a metallic portion of the film, may be external to the oxide portion of the film. The metal portion has a thickness selected to provide, in conjunction with the dielectric or oxide portion of the film, a desired transmittance and reflectance. The total thickness of the coating is a periodic function of the wavelengths to be transmitted, the wavelengths to be reflected, and the refractive indices of the oxide and metallic portions of the film.

According to the further exemplification of the invention, a thin film of high reflectivity metal, i.e., a coinage metal of Group IB of the Periodic Chart, such as copper, silver, or gold is present on the otherwise free surface of the oxide. In this way, a first interface or surface is provided at the dielectric-substrate interface, i.e., the surface of the oxide remote from the group IB metal, and a second reflective interface is provided between the dielectric thin film and the thin film of highly reflective IB metal. By proper control of the thickness of the dielectric thin film and the thickness of the Group IB metal, it is possible to obtain colors of very high finesse for a wide range of transmissivities.

High finesse has heretofore been difficult to obtain in combination with high transmissivity. The thin film of the Group IB metal makes it possible to obtain high finesse over a wide range of transmissivities.

Finesse is a measure of the purity of the color of the reflected light, that is the maximum and minimum reflectivities as a function of wavelength. High finesse is associated with a large difference between reflectivities as a function of wavelength, while low finesse is associated with smaller differences between reflectivities as a function of wavelength. Finesse is a function of optical interactions, e.g., reflections, at boundaries and interfaces. Finesse is relatively high when the boundaries of the layer or layers providing interference have relatively equal reflectivities of high amplitude.

According to the invention herein contemplated, the dielectric thin film layers may be deposited as a metal with subsequent oxidation, or directly as a dielectric deposition of the dielectric may be by sputtering, reactive sputtering chemical vapor deposition, spray pyrolysis, plasma assisted chemical vapor deposition including glow discharge, and radio frequency and direct current plasma assisted chemical vapor deposition including a microwave excited, plasma assisted chemical vapor deposition. Especially preferred is reactive sputtering of the dielectric atop a sputtered interfacial film, e.g., a reactively, sputtered thin film of niobium oxide atop a 100 to 200 Angstrom film of niobium.

Oxidation may be carried out by depositing the thin film directly as an oxide, for example by chemical vapor deposition, reactive sputtering or by glow discharge with a suitable oxidizing gas or by subsequent oxidation. Preferably reactive sputtering is used.

Alternatively, oxidation may be carried out by thermal oxidation of an as deposited unoxidized film of transition metal in contact with air or with any other appropriate reagent. The color displayed by the oxidized film depends on both the temperature at which the film is oxidized and the duration of the oxidation process. By proper control of these variables, a uniform color of the desired hue may be obtained in the coating.

Alternatively, oxidation may also be carried out by plasma oxidation of the as deposited unoxidized film. The plasma oxidation may be carried out in an atmosphere of, for example, substantially pure $O_2$, $He/N_2O$, $O_2/He$, and $O_2/Ar$.

The coinage metal film may be deposited atop the dielectric, e.g., by evaporation, or by sputtering, by spraypyrolysis, or by other methods well known in the art.

THE FIGURES

The invention may be understood by reference to the Figures appended hereto.

DETAILED DESCRIPTION OF THE INVENTION

Figure 1:
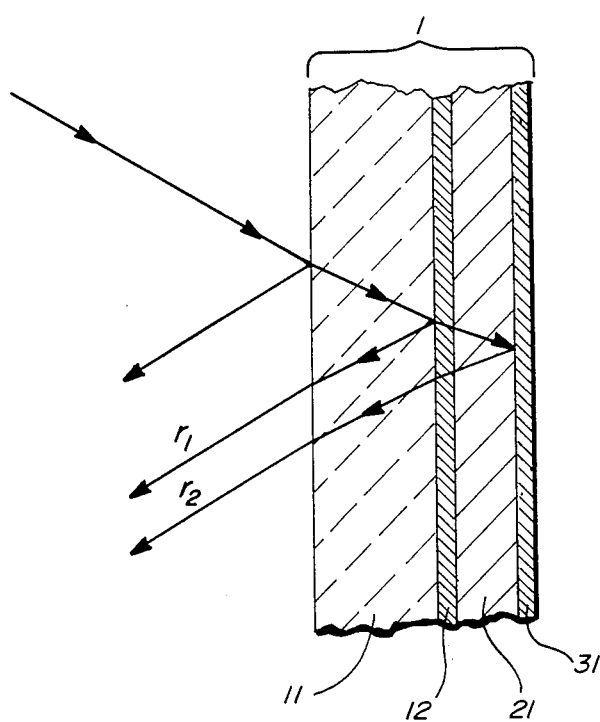
FIG. 1 shows one embodiment of an oxidized transition metal thin film deposited on a surface of a suitable transparent substrate.

According to one embodiment of the invention herein contemplated and illustrated in FIG. 1, there is provided a semi-transparent reflective article 1 comprising a substantially transparent substrate 11, and a bilayer dielectric thin film formed of a metallic thin film layer 12, and an oxidized thin film 21. The thin film 21 may be a thin film of a transition metal oxide or other dielectric that is substantially transparent when present as a thin film. The dielectric thin film 21 has a thickness sufficient to provide substantially constructive interference of one desired band of optical wavelengths, and destructive interference of other bands. Optionally, there is a layer, e.g., an adhesion layer or interfacial layer 12, of metal between the transparent substrate 11 and the dielectric thin film 21. The interfacial layer 12, when present, is thin enough to avoid internal reflections, and is generally from about 100 to 200 Angstroms thick. Greater thickness may result in a substantial blockage of light and increase in undesired internal reflection. When the "dielectric-substrate interface" is referred to this substrate is also encompassed thereby.

Generally, the thickness of the dielectric thin film 21 is at least thick enough for first order reflections, but not so thick as to result in substantial reflections of low finesse, dull colors. That is, the thickness is from generally about 420 angstroms to about 3200 angstroms. The lower limit of 420 angstroms is for the first order reflection, i.e. that which forms the first order fringes. The upper limit is dictated by the loss of aesthetically pleasing colors. For second and higher order reflections, the thickness is greater than 420 Angstroms, and is an odd multiple of a quarter wavelength of the desired color.

For partially transparent coatings the order number of the fringes may be any that does not result in a dielectric film so thick as to degrade the intended optical function. Generally the fringe order number is less than 10. Most commonly the order number is 1,2, or 3, depending upon the desired pitch, hue, and saturation. For example, the first purple fringe gives a royal purple, while the second purple fringe gives a plum-lilac color. For green, the first fringe gives a yellow-green, while the second fringe gives a bright lime green.

When a metallic layer 31 is present atop the dielectric thin film 21 the thickness of the metallic layer 31 is sufficient to provide an optical transmission coefficient, from a weighted integration over the desired segment of the visible portion of the electromagnetic spectrum, of at least about 0.001. This provides some degree of optical transmissivity. When present, the metallic portion 31 of the film is generally from about 100 angstroms thick to about 500 angstroms thick. Thicknesses of greater than about 200 angstroms result in a substantial blockage of light.

Figure 2:
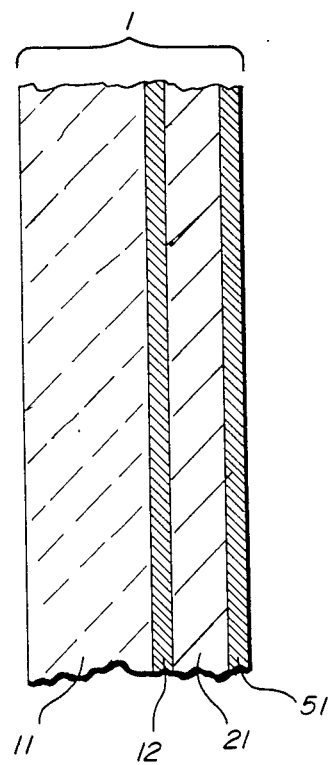
FIG. 2 shows an alternative embodiment of the invention where a Group IB metal is interposed between the transition metal and the second surface of the transparent substrate. The transition metal is substantially fully anodized or oxidized.

According to a further embodiment of the invention shown in FIG. 2 there is provided a transparent coated article 1 comprising a transparent substrate 11 having a coating thereon. The coating has an internal dielectric thin film 21 in contact either with the substrate or an interfacial layer 12, and a thin film 51 of a Group IB coinage metal (Cu, Ag, Au). This results in the formation of a second interface, between the oxide thin film 21 and the Group IB metal thin film 51.

The free surface is the surface of the dielectric 21 remote from the substrate 11, and interfacial metal layer 12. The reflectivities of (1) the free surface of the dielectric at its interface with the thin film of the Group IB coinage metal, and (2) the interface of the dielectric thin film 21 with the substrate 11 and/or metallic thin film 12, are such that the reflectivities are large and approach each other in numerical value, thereby resulting in a high finesse coating.

Finesse is a measure of the purity of the color of the reflected light, i.e., the maximum and minimum reflectivities as a function of wavelength. High finesse is a high ratio of maximum reflectivity to minimum reflectivity, while low finesse is a low ratio of maximum reflectivity to minimum reflectivity. Finesse is a function of interactions at boundaries and/or interfaces. It is relatively high when both boundaries of the dielectric thin film 21, i.e., its interface with the substrate 11 and/or interfacial layer 12 and its interface with the Group IB metal thin film 51, have the same high reflectivity.

In the embodiment shown in FIG. 2, the interface between the dielectric thin film 21 and the Group IB metal film 51 is a high reflectivity interface, i.e., higher than the reflectivity at the free surface of the dielectric thin film 21, thereby resulting in a high finesse coating.

The film 51 of the Group IB metal may be a substantially transparent film having a thickness of about 30 to about 200 angstroms. The Group IB metal is chosen from the group consisting of copper, silver, and gold. The Group IB metal is preferably one having an optical absorption edge beyond the visible portion of the electromagnetic spectrum, i.e., silver.

The transition metal used to form the dielectric thin film 21 is a transition metal that readily forms an oxide when rendered anodic in suitable electrolytic media, for example, titanium, zirconium, hafnium, vanadium, niobium, tantalum, chromium, molybdenum, and tungsten. These metals are referred to as the "valve" metals and "film forming metals". Especially preferred because of its brilliant colors and ease of oxidation control is niobium. Other preferred metals include titanium, tantalum, and molybdenum.

In a particularly preferred examplification the transparent article 1 has a glass substrate 11, with a bilayer of a transition metal interfacial layer 12, of 100 to 200 Angstroms on the substrate 11, and a dielectric film 21 on the interfacial layer 12. The dielectric film 21 has a thickness of an odd quarter wave length of the light to be constructively reinforced. This thickness is from about 420 to 3200 Angstroms. In an alternative exemplification a thin film 41 or a thin film 51 of a Group IB metal, as Ag, Au, or Cu, is deposited atop the dielectric thin film 21. This thin film is from about 100 to 200 or more Angstroms thick.

Figure 3:
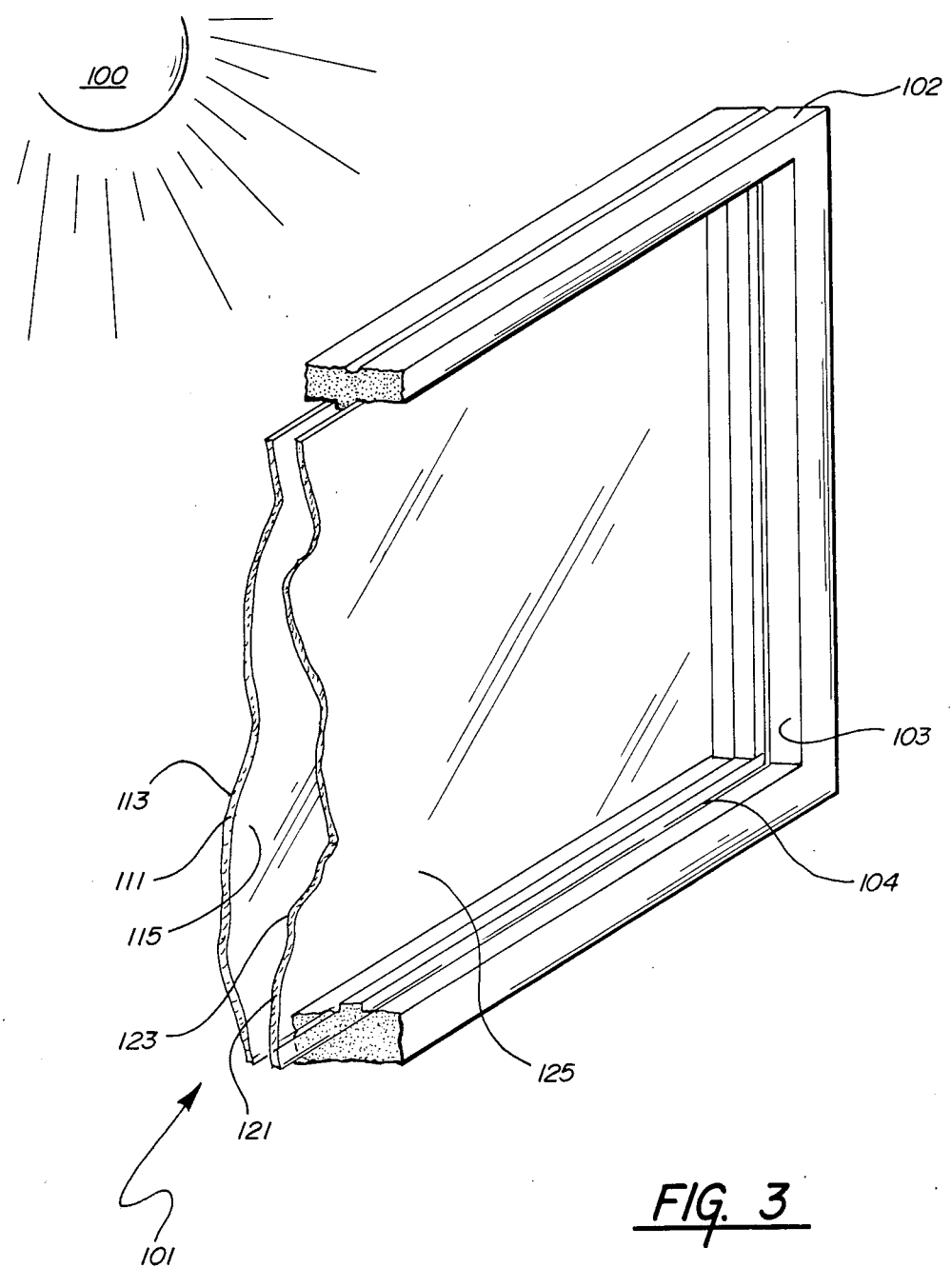
FIG. 3 shows a thermally insulating glazing unit utilizing the second surface reflecting transparencies of the invention.

The transparent, reflective sheet 1 may be incorporated in the glazing unit 101 of FIG. 3. The glazing unit 101 has a first transparency 111 with a first light incident, surface 113 and a second surface 115 with the herein contemplated dielectric thin film coating, and a second transparency 121 with a light incident third surface 123 and a fourth surface 125. The transparencies 111, 121 are carried in a frame 102 and sash 103 by glazing beads 104. The glazing unit may have a gas space between the transparencies 111, 121, or the transparencies 111, 121 may be in direct contact, e.g., with an adhesive.

According to a particularly preferred exemplification of forming the article herein contemplated, the thin films are deposited by vacuum techniques, for example, evaporation or sputtering in the case of silver, and sputtering, reactive sputtering, plasma assisted chemical deposition including radio frequency plasma assisted chemical vapor deposition and direct current plasma assisted chemical vapor deposition in the case of the transition metals and their compounds useful herein.

According to a particularly preferred exemplification, the Group IB metal thin film, when present, is deposited by sputtering, and the transition metal oxide is deposited by reactive sputtering.

According to one examplification the dielectric thin film is deposited as a metal and thereafter plasma oxidized. By the term "plasma oxidation" is meant contacting the article with energized ions of an appropriate gas, typically, substantially pure $O_2$, $He/N_2O$, $O_2$ in He, and $O_2$ in Ar. The gas is at a very low pressure, e.g., 1 millitorr, and a plasma may be generated by any means known in the art, such as microwave energy.

According to an alternative exemplification the dielectric thin film is deposited as a metal and thereafter thermally oxidized. By the term "thermal oxidation" is meant contacting the article with an appropriate oxidizing reagent at an elevated temperature. The reagent may be any suitable oxidizing reagent such as, by way of example, air, oxygen, hydrogen peroxide, permangenate, dichromate, ozone, acids, perchlorates and the like. For example, according to this exemplification, the transition metal is deposited by sputtering and thereafter thermally oxidized in air. Oxidation may be controlled by controlling the temperature at which the process is carried out, by controlling the duration of the process, or by controlling both. Proper control of those parameters will result in a coating of uniform color of any desired hue.

According to another particularly preferred exemplification, the transition metal is deposited by sputtering and thereafter plasma oxidized in substantially pure $O_2$, in $He/N_2O$, in $O_2$ in Ar, or in $O_2$ in He. Oxidation may be controlled by controlling the duration of the process, by controlling substrate temperature, by controlling the plasma power density of the plasma, or by control of the gas mix to obtain the desired color.

According to a particularly preferred examplification the dielectric thin film 21 is deposited by sputtering the interfacial thin film 12, and thereafter reactively sputtering the dielectric thin film 21.

The following examples are illustrative of the method of the invention.

EXAMPLE 1

Coupons of glass having thin film niobium oxide coatings on their second surface and their color responses were observed. The samples were prepared by sputtering a 100 to 200 Angstrom thick niobium thin film onto glass substrates, and thereafter reactively sputtering niobium in an $O_2$/Argon atmosphere atop the niobium thin film.

Figure 4:
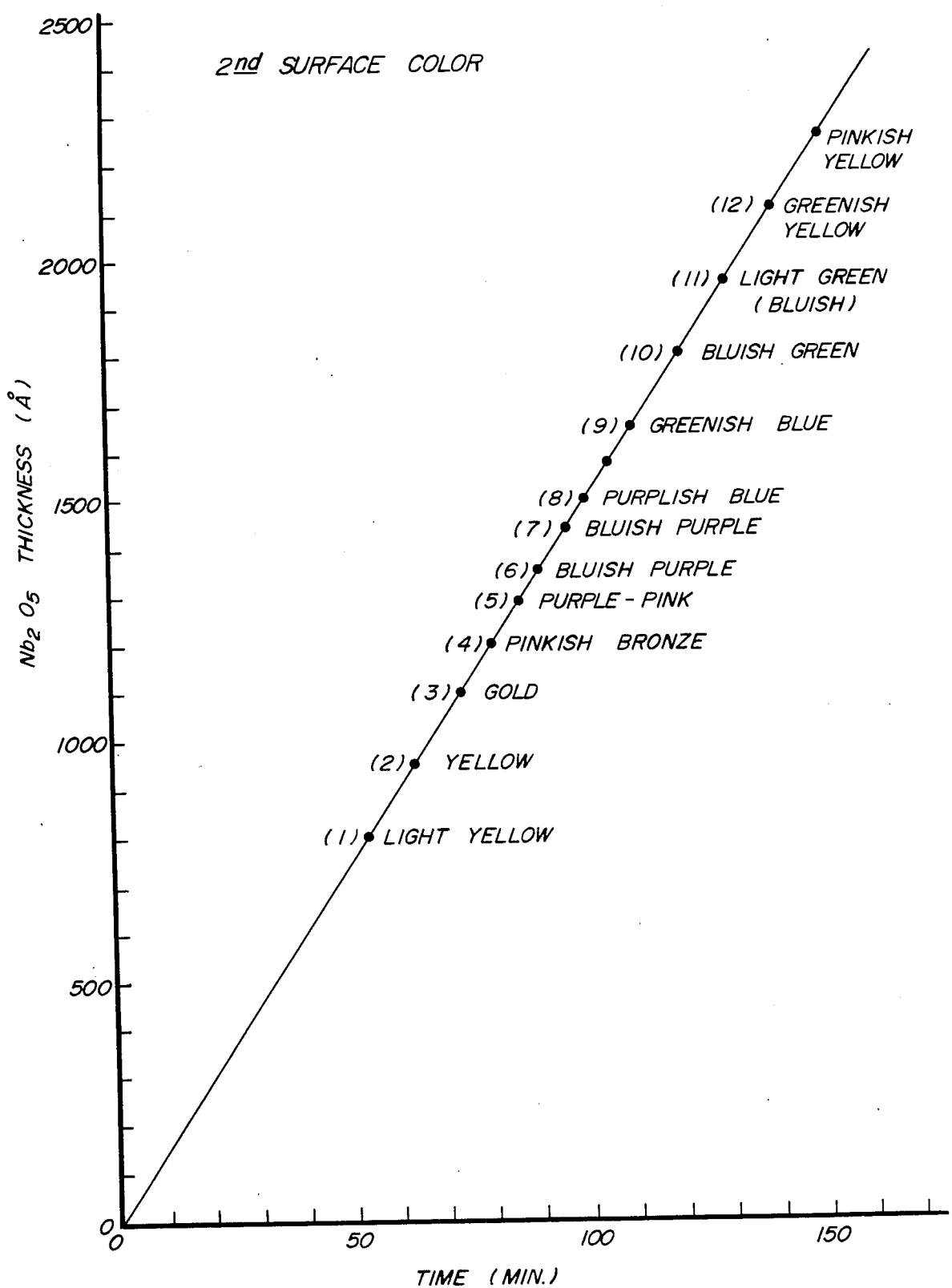
FIG. 4 is a graphical representation of the reflected color versus the thickness of the dielectric film.

The niobium was sputtered onto the glass targets from a 5 inch by 8 inch target at a power of 500 watts in a 2 to 10 millitorr argon atmosphere. The niobium was deposited at a rate of 0.5 Angstrom per second. Thereafter, the argon was partially replaced with oxygen to provide an oxygen/argon ratio of 20/80 at 2 to 10 millitorrs. The samples were then removed from the sputtering apparatus. The results shown in Table I, below, and reproduced in FIG. 4 were obtain.

TABLE I

| | $Nb_2O_5$ Thickness Versus Reactive Sputtering Time Versus Color | | |
|---|---|---|---|
| Run # | Reactive Sputtering Time (min) | Thickness (Angstroms) | Color |
| 1. | 53 | 800 | Light Yellow |
| 2. | 63 | 950 | Yellow |
| 3. | 73 | 1100 | Gold |
| 4. | 80 | 1200 | Pinkish-Orange |
| 5. | 86 | 1300 | Purple-Pink |
| 6. | 90 | 1350 | Bluish-Purple |
| 7. | 97 | 1440 | Bluish-Purple |
| 8. | 100 | 1500 | Purplish-Blue |
| 9. | 110 | 1650 | Greenish-Blue |
| 10. | 120 | 1800 | Bluish-Green |
| 11. | 130 | 1950 | Light Green |
| 12. | 140 | 2100 | Greenish-Yellow |
| 13. | 150 | 2250 | Pinkish-Yellow |

While the invention has been described with respect to certain preferred exemplifications and embodiments, it is not intended to be limited thereby, but solely by the claims appended hereto.

What we claim is:

1. A multi-glazed architecturally transparent article adapted for use as a window capable of transmitting portions of the visible spectrum and reflecting portions of the visible spectrum, comprising:
   a. a pair of transparent glass or polymeric substrates each having a first and second surface; and
   b. a bilayer thin film on the second surface of the first one of said substrates, the bilayer thin film comprising a metallic layer on the substrate and a dielectric layer atop the metallic layer, the dielectric being a compound of the metal forming the metallic layer, the metal being chosen from the group consisting of Ti, Zr, Hf, V, Nb, Ta, Cr, Mo, and W, the dielectric layer having a thickness to provide substantially constructive interference of the first order reflections of a desired band of optical wavelengths, and destructive interference of other bands of optical wavelengths, and the thickness of the bilayer thin film being such to produce an integrated optical transmission coefficient.

2. The architecturally transparent article of claim 1 wherein the thickness of the dielectric layer is from about 420 Angstroms to about 3200 Angstroms.

3. The architecturally transparent article of claim 2 further comprising a thin film of a Group IB metal atop the dielectric thin film.

4. The architecturally transparent article of claim 3 wherein the Group IB metal is Ag.

5. The architecturally transparent article of claim 4 wherein the thin film of Group IB metal is from 30 to 200 Angstroms thick.

* * * * *